United States Patent
Power, II et al.

(10) Patent No.: US 10,791,729 B1
(45) Date of Patent: Oct. 6, 2020

(54) TREE STAND PLATFORM ASSEMBLY

(71) Applicant: Tethrd LLC, Jordan, MN (US)

(72) Inventors: Walter Ernest Power, II, Jordan, MN (US); Gregory Alan Godfrey, Richmond Hill, GA (US); Garrett Robert Prahl, Brooklyn Park, MN (US)

(*) Notice: Subject to any disclaimer, the term of this patent is extended or adjusted under 35 U.S.C. 154(b) by 0 days.

(21) Appl. No.: 16/375,378

(22) Filed: Apr. 4, 2019

Related U.S. Application Data

(63) Continuation of application No. 16/364,979, filed on Mar. 26, 2019, now abandoned.

(51) Int. Cl.
*A01M 31/02* (2006.01)
*F16M 13/00* (2006.01)

(52) U.S. Cl.
CPC ............ *A01M 31/02* (2013.01); *F16M 13/00* (2013.01)

(58) Field of Classification Search
CPC .. E06C 1/34; E06C 1/36; A01M 31/02; A01K 29/00; E04G 3/00; E04G 3/24; B22D 17/00; B29C 45/00
See application file for complete search history.

(56) References Cited

U.S. PATENT DOCUMENTS

| | | | | |
|---|---|---|---|---|
| 4,936,416 | A * | 6/1990 | Garon | A01M 31/02 108/152 |
| 5,143,177 | A * | 9/1992 | Smith | A01M 31/02 182/136 |
| 5,515,943 | A * | 5/1996 | Antonelli | A01M 31/02 108/152 |
| 6,029,772 | A * | 2/2000 | Takahashi | E06C 7/086 182/18 |
| 9,089,125 | B1 * | 7/2015 | Fast | E04G 3/24 |
| 9,326,500 | B2 * | 5/2016 | Overbaugh | A01M 31/02 |
| 2003/0127286 | A1 * | 7/2003 | Engstrom | A01M 31/02 182/136 |
| 2004/0074698 | A1 * | 4/2004 | Lawrence | A47G 27/0287 182/129 |
| 2005/0269157 | A1 * | 12/2005 | Boice | A01M 31/02 182/136 |
| 2010/0236865 | A1 * | 9/2010 | Crowton | E06C 1/26 182/129 |
| 2011/0132686 | A1 * | 6/2011 | Priest | A01M 31/02 182/187 |

(Continued)

OTHER PUBLICATIONS

Image of existing product. Manufacturer Unknown.

*Primary Examiner* — Katherine W Mitchell
*Assistant Examiner* — Candace L Bradford

(57) ABSTRACT

A tree stand platform assembly includes a platform for supporting a hunter and which has a perimeter edge. The perimeter edge includes a front edge, a rear edge, a first lateral edge and a second lateral edge. The platform has a top surface, a bottom surface and an outer surface positioned between the top and bottom surfaces. The first and second lateral edges each include a front section abutting the front edge and a rear section abutting the rear edge. The rear section includes toe receiver. The toe receiver is formed by an obtuse angle formed in the outer surface of the rear section, wherein the obtuse angle is less than 160°. The toe receiver provides an engagement point for a hunter's foot as the hunter rotates laterally away from the platform.

14 Claims, 6 Drawing Sheets

(56) References Cited

U.S. PATENT DOCUMENTS

| | | | |
|---|---|---|---|
| 2011/0133045 A1* | 6/2011 | Sorum | A01M 31/02 248/219.4 |
| 2012/0080269 A1* | 4/2012 | Furseth | A01M 31/02 182/187 |
| 2014/0190767 A1* | 7/2014 | Wheelington | A01M 31/02 182/129 |
| 2015/0034419 A1* | 2/2015 | Blackwell | A01M 31/02 182/187 |
| 2017/0265454 A1* | 9/2017 | Kramer | A01M 31/02 |
| 2019/0055782 A1* | 2/2019 | Infalt | E06C 1/381 |

* cited by examiner

TREE STAND PLATFORM ASSEMBLY

CROSS-REFERENCE TO RELATED APPLICATIONS

This application is a continuation application and I hereby claim the benefit under 35 U.S.C. Section 120 of U.S. patent application Ser. No. 16/364,979 filed Mar. 26, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The invention generally relates to tree stands used for hunting purposes and more particularly those tree strands which are not permanently fixed to a tree.

(2) Description of Related Art Including Information Disclosed Under 37 CFR 1.97 and 1.98

The disclosure and prior art relates to tree stand devices and more particularly pertains to a new tree stand device for providing greater leverage and stability for a hunter while the hunter is rotating their body relative to the tree stand. The invention further includes embodiments having gripping protuberances extending outwardly from an edge of platform to enhance gripping of the platform along its perimeter edge.

BRIEF SUMMARY OF THE INVENTION

An embodiment of the disclosure meets the needs presented above by generally comprising a platform for supporting a hunter and which has a perimeter edge. The perimeter edge includes a front edge, a rear edge, a first lateral edge and a second lateral edge. The platform has a top surface, a bottom surface and an outer surface positioned between the top and bottom surfaces. The first and second lateral edges each include a front section abutting the front edge and a rear section abutting the rear edge. The rear section includes toe receiver. The toe receiver is formed by an obtuse angle formed in the outer surface of the rear section, wherein the obtuse angle is less than 160°. The toe receiver provides an engagement point for a hunter's foot as the hunter rotates laterally away from the platform.

In another embodiment, the disclosure generally includes a platform having a perimeter edge, wherein the perimeter edge includes a front edge, a rear edge, a first lateral edge and a second lateral edge. The platform has a top surface, a bottom surface and an outer surface positioned between the top and bottom surfaces. A plurality of gripping protuberances extends outwardly away from the outer surface of each of the first and second lateral edges.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
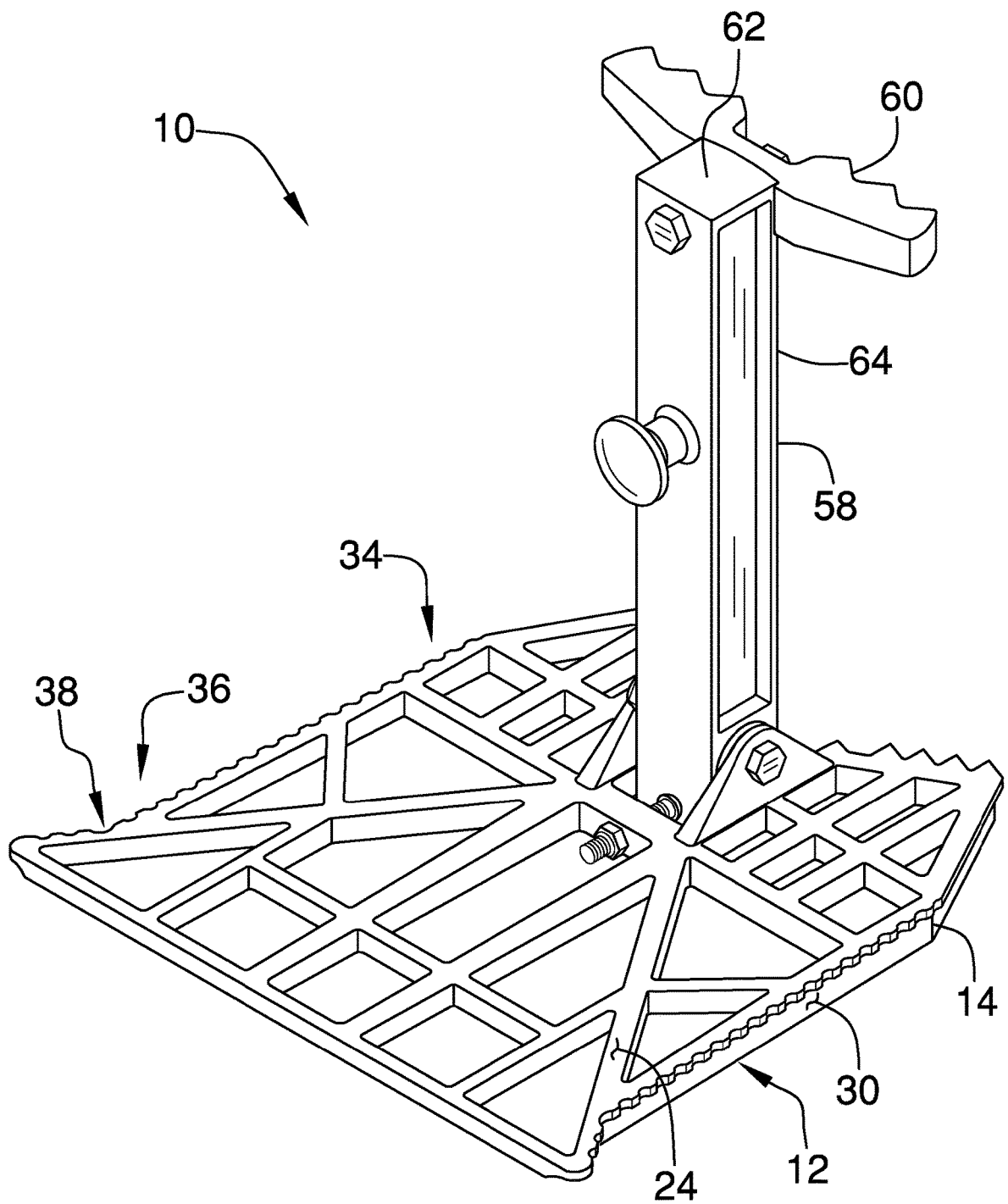
FIG. 1 is a rear isometric view of a tree stand platform assembly according to an embodiment of the disclosure.
Figure 2:
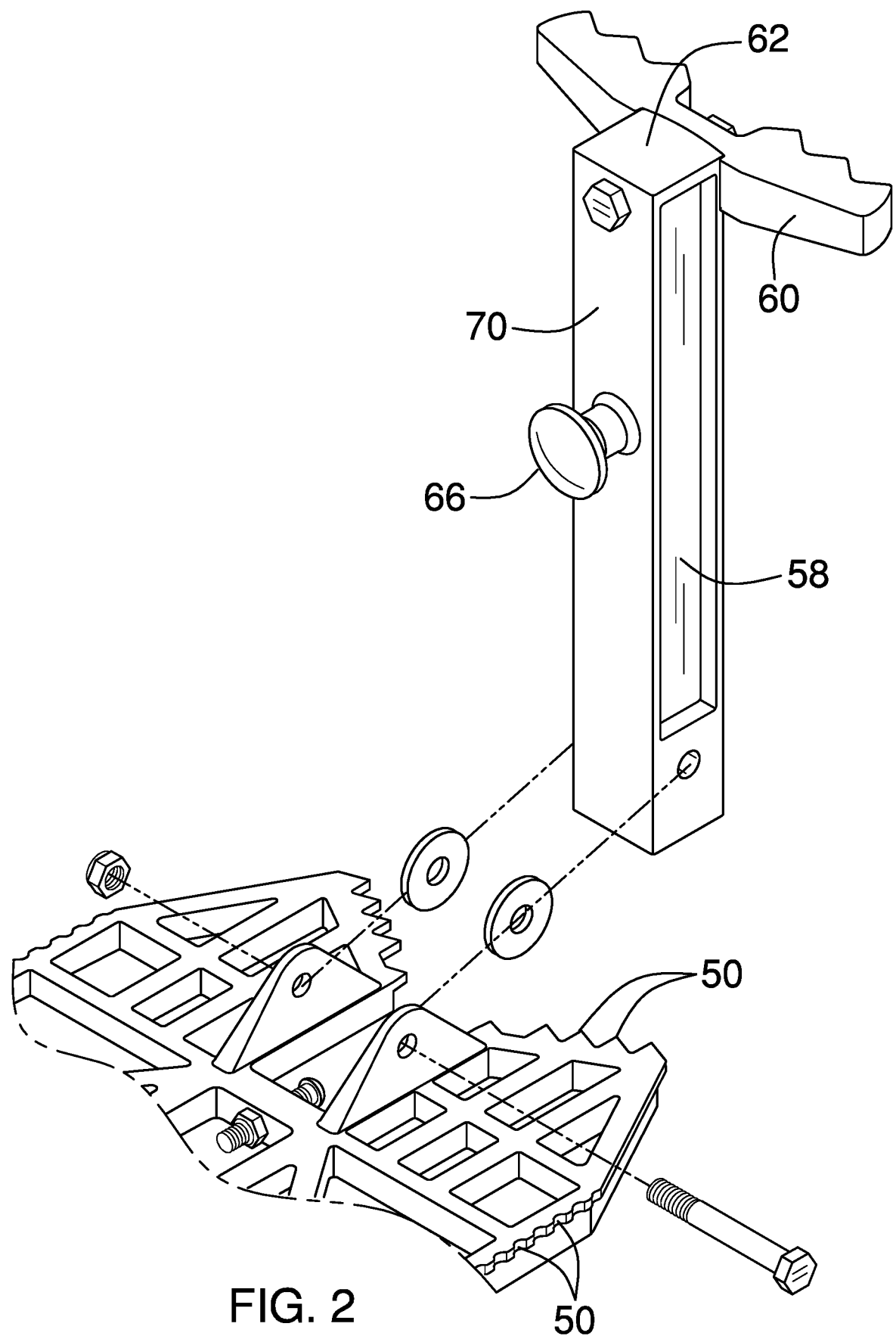
FIG. 2 is a rear exploded isometric view of an embodiment of the disclosure.

With reference now to the drawings, and in particular to FIGS. 1 through 6 thereof, a new tree stand device embodying the principles and concepts of an embodiment of the disclosure and generally designated by the reference numeral 10 will be described.

As best illustrated in FIGS. 1 through 6, the tree stand platform assembly 10 generally comprises a platform 12 that has a perimeter edge 14 which includes a front edge 16, a rear edge 18, a first lateral edge 20 and a second lateral edge 22. The platform 12 has a top surface 24, a bottom surface 26 and an outer surface 30 positioned between the top 24 and bottom 26 surfaces. As can be seen in the Figures, the interior of the platform 12 may be comprised of a framework 32 of webbing or interior supports. The particular pattern is will not affect the structure, however, by using a framework 32 instead of a solid material, the weight and costs of construction of the platform 12 are reduced while providing traction along the edges of the individual sections of the framework 32. However, it should be understood that the platform 12 could be comprised of a solid piece of material. The platform 12 may be constructed from any conventional rigid building material through metallic materials such aluminum alloys may be preferred based on weight to strength ratios as well as cost of materials. The platform 12 will typically have an overall greatest length and width each being between about 10.0 inches and 18.0 inches. The platform will have a height from the bottom surface 26 to the top surface 24 typically less than 2.0 inches.

Figure 5:
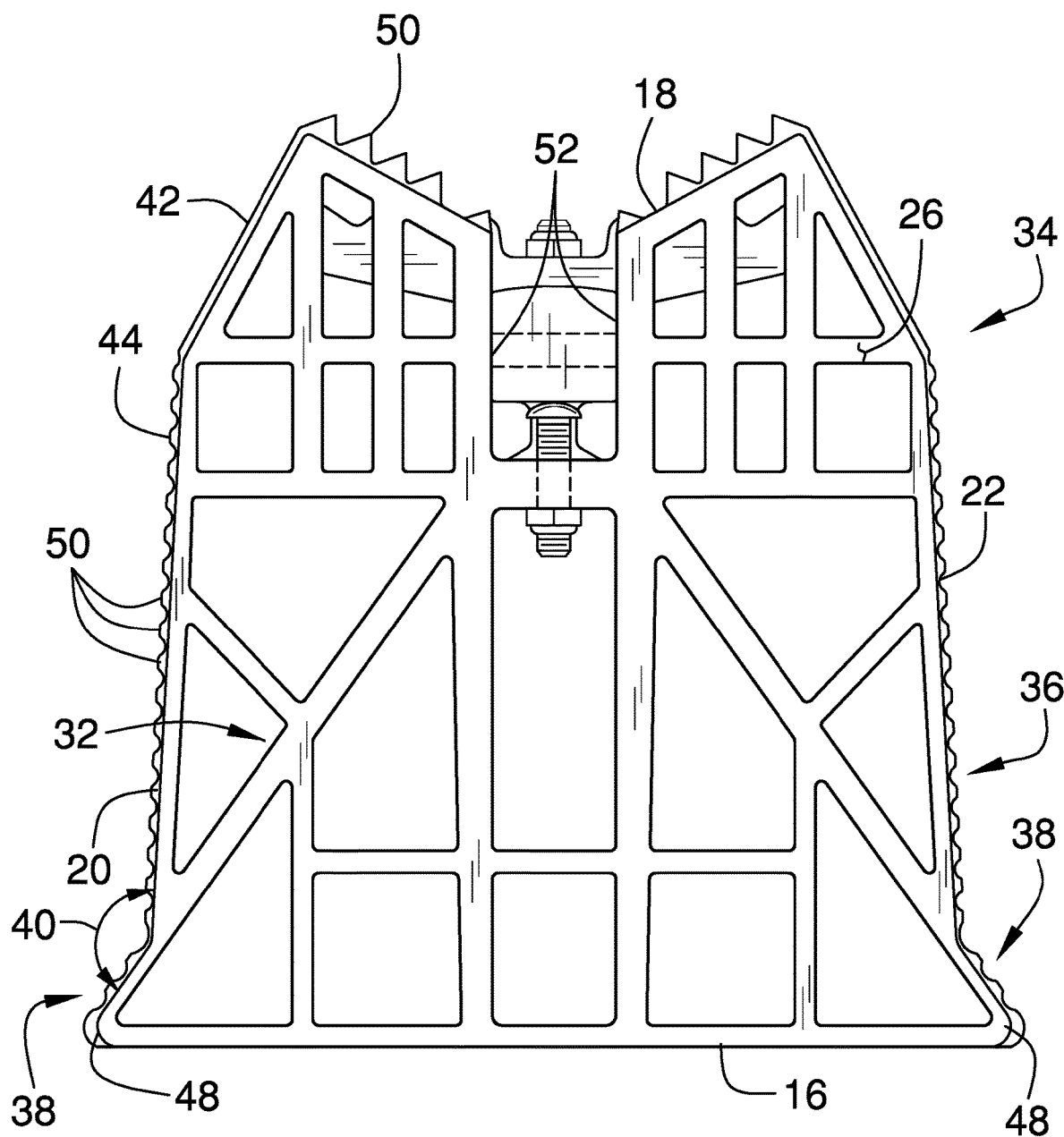
FIG. 5 is a bottom view of an embodiment of the disclosure.

The first 20 and second 22 lateral edges each include a front section 34 abutting the front edge 18 and a rear section 36 abutting the rear edge 16. The front sections 34 include at least ¼ of the first 20 and second 22 lateral sections. The rear section 36, of each of the first 20 and second 22 lateral sections includes a toe receiver 38. The toe receiver 38 is formed by bend in the outer surface 30 which forms an angle 40 in the outer surface having a measurement of less than 160°. Typically this angle 40 will measure from 90° to 160°. The toe receiver 38 will most often be positioned at the juncture of the top surface 24 and the outer surface 30. More specifically, as can be seen best in FIG. 5, a length of the front edge 18, as measured from the first lateral edge 20 to the second lateral edge 22, is shorter than the rear edge 16. The front section 34, as it moves from the front edge 18 and toward the rear edge 16 may be angled outwardly such that the front sections 34 taper outwardly as they travel from the front edge 18. Alternatively, the front sections 34 may be orientated perpendicular to each other. FIG. 5 depicts the front sections 34 including a first portion 42 being angled outwardly further than a second portion 44, though this structure is not critical to the invention.

The rear section 36 includes a continuation of the second portion 44 as described above and shown in the Figures. However, the second section 44 includes an outward bend, as opposed to the inward bend between the first 42 and second 44 portions, to define a wing 48 that acts as the toe receiver 38, or toe kick, that can be engaged by a person's foot as they attempt to position their body around a tree 46. The wings 48 can extend outwardly from a remaining portion of the first 20 and second 22 lateral edges any desired length but will typically be less than 7.0 inches, as extension beyond this length is unneeded, and at least 1.0 inches.

A plurality of gripping protuberances 50 extends outwardly away from the outer surface 30 of each of the first 20 and second 22 lateral edges. The gripping protuberances 50 are positioned on each of the front 34 and rear 36 sections and in particular will also be positioned along the toe receivers 38. As can be seen in the Figures, the gripping protuberances 50 are also found along the front edge 18 to assist in frictionally engaging the surface of the tree 46.

The positioning of the gripping protuberances 50 on the outer surface 30 provides gripping for a hunter as a hunter rotates their body relative to the platform 12. Most particularly when the hunter is using the first 20 and second 22 lateral edges to stabilize their body when pushing outwardly and laterally away from the tree 46 and the platform 12, the gripping protuberances prevent the hunter's footwear from sliding along the first 20 and second lateral edges 22. To that end, the gripping protuberances 50 may be structured such that the gripping protuberances extend no higher than a plane of the top surface 24. Alternatively, the gripping protuberances 50 may extend outwardly from the outer surface 30 as well as upwardly from the outer surface 30 such that they extend above the plane of the top surface 24. Generally, it is the extension laterally away from the platform 24 which provides the advantages of these additional gripping protuberances 50.

The front edge 18 includes a receiving notch 52 therein that is spaced from the first 20 and second 22 lateral edges.

Figure 3:
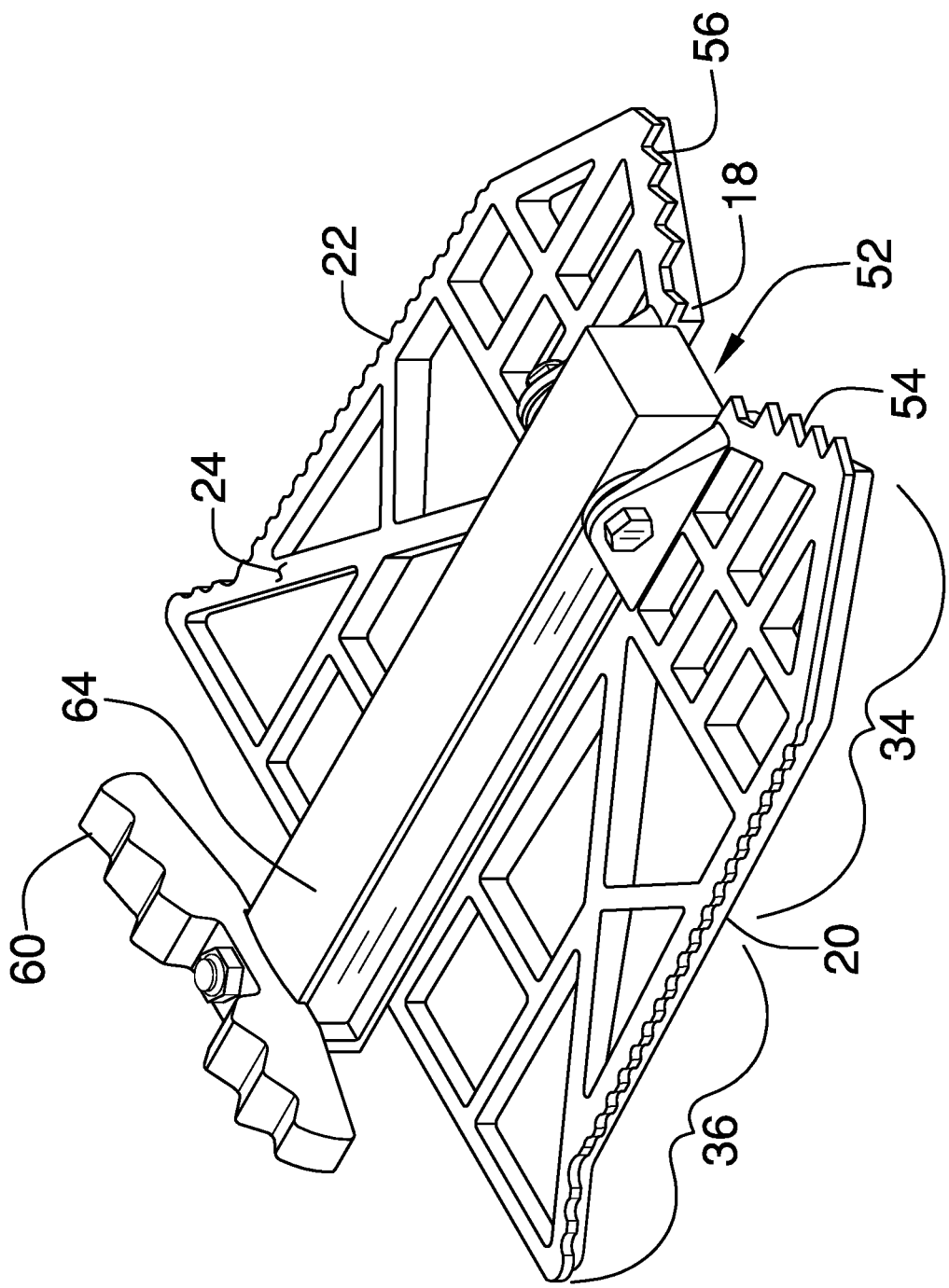
FIG. 3 is a front isometric view of an embodiment of the disclosure.
Figure 4:
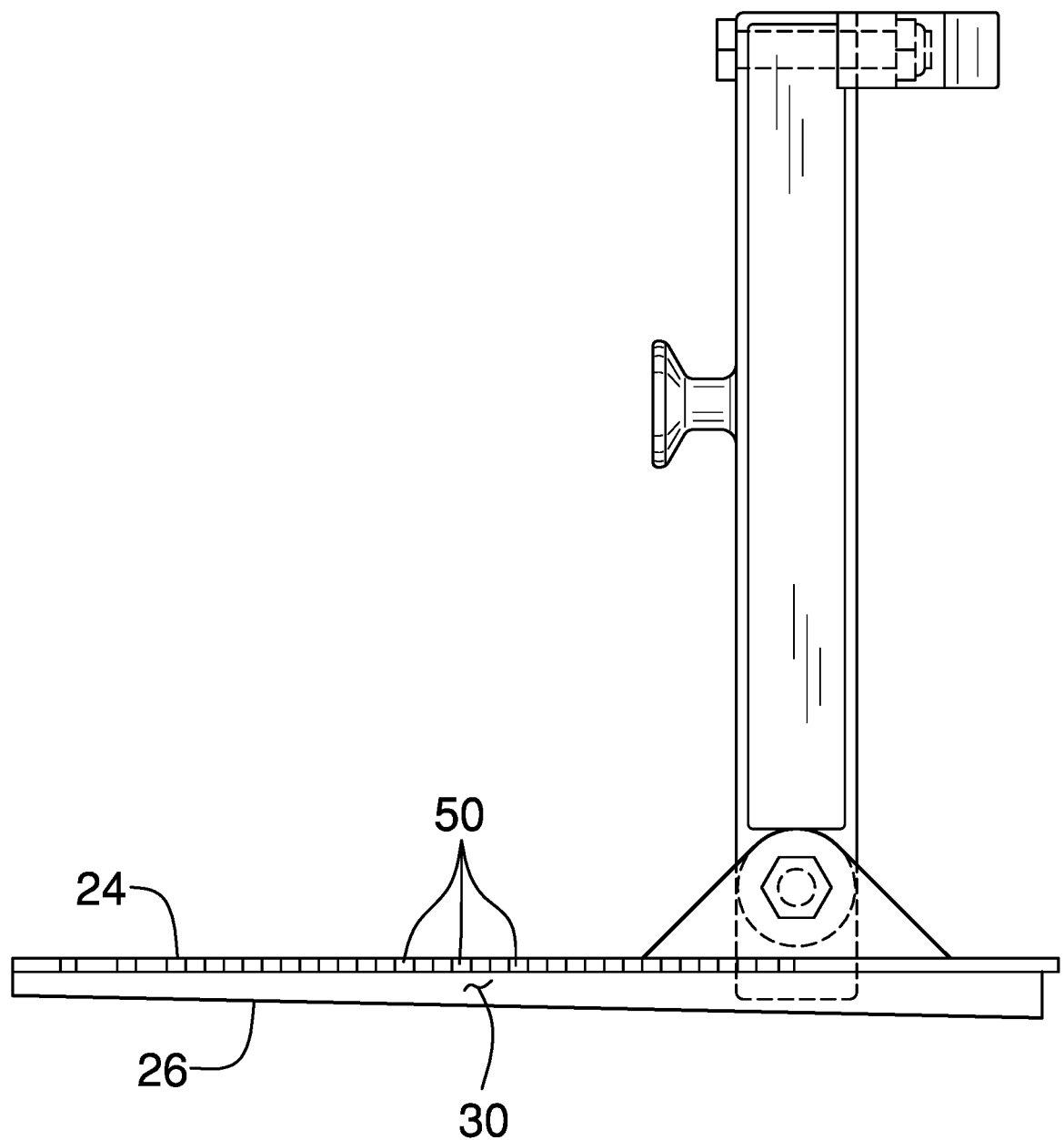
FIG. 4 is a side view of an embodiment of the disclosure.

As shown in FIG. 3, the front edge 18 has a shape to partially receive a tree 46 trunk. The front edge 18 may includes a first section 54 positioned between the first lateral edge 20 and the receiving notch 52 and a second section 56 positioned between the second lateral edge 22 and the receiving notch 52, wherein the first 54 and second 56 sections are angled inwardly from a respective one of the first 20 and second 22 lateral edges toward the receiving notch 52. This forms V-shaped depression, leading to the notch 52, and which can engage the tree 46 as shown in FIG. 6.

A post 58 is attached to the platform 12 adjacent to the front edge 18. The post 58 extends upwardly from the platform 12. A cleat 60 is attached to the post 58 adjacent to an upper end 62 of the post 58 and is positioned on a front side 64 of the post 58. The cleat 60 is configured to engage a surface of the tree 46. The post 58 is pivotally coupled to the platform 12 and extends into the notch when the post 58 is in a vertical orientation extending upwardly from the platform 12. A hold 66 is attached to the post 58. The hold 66 may be knobbed shape and is configured to engage a strap 68 extendable around the tree 46 by forming an attachment point for the strap 58 on the post 58. The hold 66 is positioned on a rear side 70 of the post 58. The notch 52, post 58, hold 66 and strap 68 are part of a conventional mounting system used for mounting the platform 12 to the tree 46. However, different conventional mounts may be used with the platform 12 to perform the same function. Thus the platform 12 may be attached to any mount removably attached to a tree 46 such that some configurations will not require the front edge 18 to be configured to engage the tree 46.

Figure 6:
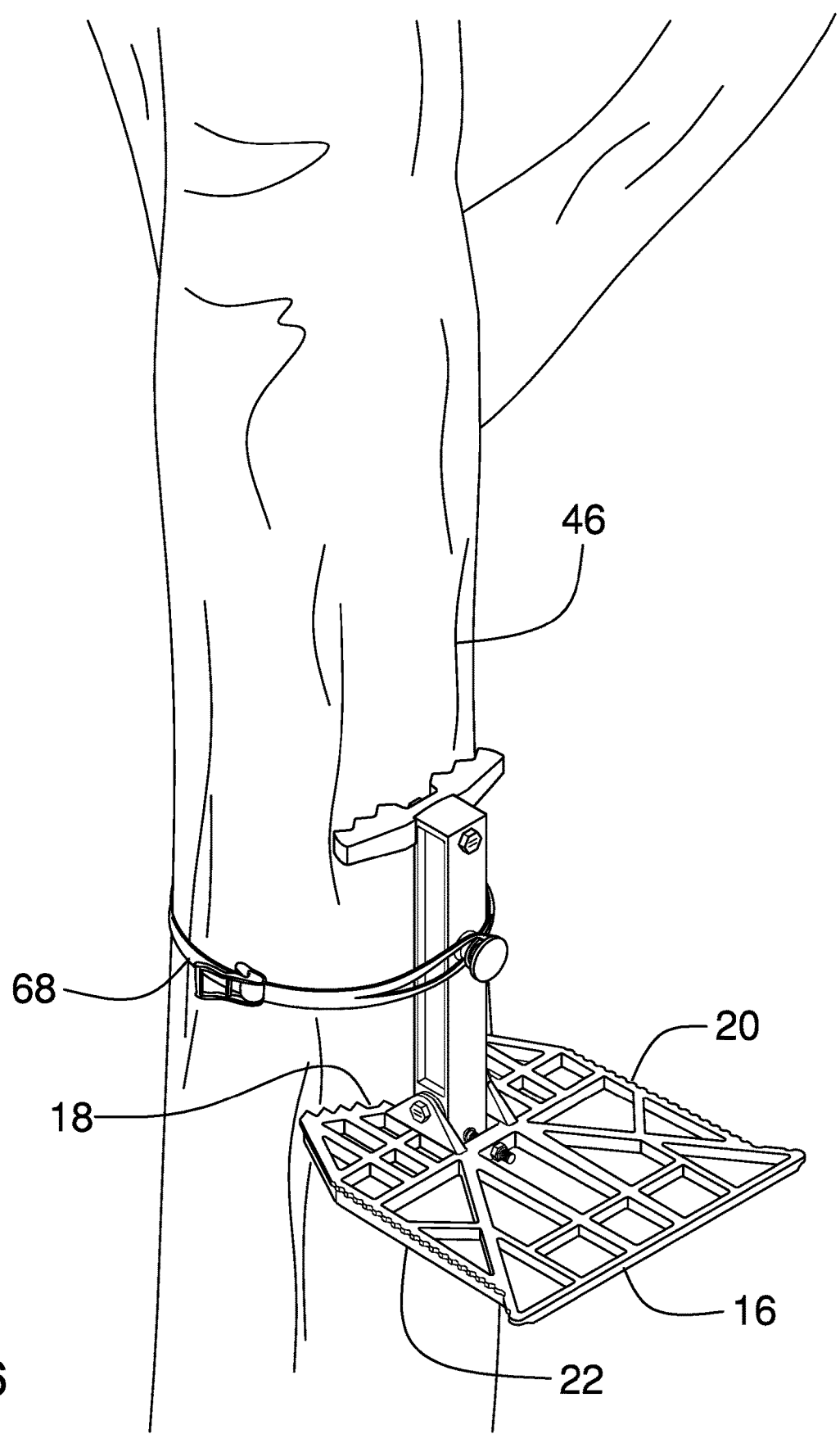
FIG. 6 is a rear, in-use isometric view of an embodiment of the disclosure.

In use, the platform 12 is mounted in a tree 46 as shown in FIG. 6 and as described above. A hunter will stand on the platform 12, typically while wearing a harness, and use the platform 12 to allow for adjustment of their body position relative to the tree 46. The harness will typically extend from below the buttocks to the lower back so that the hunter is "sitting" in the harness and is able to swing/rotate their body relative to the tree 46 to allow for getting a shot off in any direction. When bow hunting, a hunter will have need for a larger area of space in front and behind them. The hunter, for example, when shooting behind their location, i.e. in the direction extending away from the rearward edge 18, will rotate to face away from the tree 46 and move laterally to the tree 46 depending on the direction they want to release an arrow and somewhat on whether they are right or left handed. While rotating and preparing to release their arrow, the platform 12 is used for stabilization purposes. The toe receiver 38 ensures that the hunter's foot will not slide along and off the first 20 or second 22 lateral edges and provides a "stop" or toe kick to achieve a greater amount of leverage as the hunter pushes back from the platform 12 while their shoulder is positioned lateral to and possibly abutting the tree 46. Without the toe receiver 38 the hunter is more limited in how far laterally they may position their body and still maintain the stability required to effectively use a bow.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A support assembly for standing on by person hunting from a tree, the support assembly being configured to be removably securable to a tree, the support assembly including:
   a platform having a perimeter edge, the perimeter edge including a front edge, a rear edge, a first lateral edge and a second lateral edge, the platform having a top surface, a bottom surface and an outer surface positioned between the top and bottom surfaces, the top surface being planar;
   the first and second lateral edges each including:
      a front section abutting the front edge; and
      a rear section abutting the rear edge, the rear section including a toe receiver, the toe receiver being formed by a bend in the outer surface of the rear section, said bend forming an angle being less than 160° between portions of the outer surface extending away from an intersection of the bend defining the angle; and
      a plurality of gripping protuberances extending outwardly away from the outer surface of each of the first and second lateral edges in a direction coplanar with the top surface, the gripping protuberances being positioned on each of the front and rear sections.

2. The support assembly according to claim 1, further including a post being attached to the platform adjacent to the front edge, the post extending upwardly from the platform, a cleat being attached to the post adjacent to an upper end of the post, the cleat being positioned on a front side of the post and being configured to engage a surface of a tree, a hold being attached to the post, the hold being configured to engage a strap extendable around the tree, the hold being positioned on a rear side of the post.

3. The support assembly according to claim 2, the front edge having a receiving notch therein spaced from the first and second lateral edges, the post being pivotally coupled to the platform and extending into the notch when the post is in a vertical orientation extending upwardly from the platform.

4. The support assembly according to claim 3, further including a plurality of gripping protuberances extending outwardly away from the outer surface of each of the first and second lateral edges, the gripping protuberances being positioned on each of the front and rear sections.

5. The support assembly according to claim 3, wherein the front edge has a shape to receive a portion of a tree trunk, the front edge including a first section positioned between the first lateral edge and the receiving notch and a second section positioned between the second lateral edge and the receiving notch, the first and second sections being angled inwardly from a respective one of the first and second lateral edges and toward the receiving notch.

6. The support assembly according to claim 1, wherein the front edge has a shape to receive a portion of a tree trunk.

7. The support assembly according to claim 6, further including a plurality of gripping protuberances extending outwardly away from the outer surface of each of the first and second lateral edges, the gripping protuberances being positioned on each of the front and rear sections.

8. A support assembly for standing on by person hunting from a tree, the support assembly being configured to be removably securable to a tree, the support assembly including:
   a platform having a perimeter edge, the perimeter edge including a front edge, a rear edge, a first lateral edge and a second lateral edge, the platform having a top surface, a bottom surface and an outer surface positioned between the top and bottom surfaces, the top surface being planar;
   the first and second lateral edges each including:
      a front section abutting the front edge;
      a rear section abutting the rear edge, the rear section including toe receiver, the toe receiver being formed by a bend in the outer surface of the rear section, said bend forming an angle being less than 160° between portions of the outer surface extending away from an intersection of the bend defining the angle;
   a plurality of gripping protuberances extending outwardly away from the outer surface of each of the first and second lateral edges in a direction coplanar with the top surface, the gripping protuberances being positioned on each of the front and rear sections;
   the front edge having a receiving notch therein spaced from the first and second lateral edges;
   the front edge having a shape to receive a portion of a tree trunk, the front edge including a first section positioned between the first lateral edge and the receiving notch and a second section positioned between the second lateral edge and the receiving notch, the first and second sections being angled inwardly from a respective one of the first and second lateral edges and toward the receiving notch;
   a post being attached to the platform adjacent to the front edge, the post extending upwardly from the platform, a cleat being attached to the post adjacent to an upper end of the post, the cleat being positioned on a front side of the post and being configured to engage a surface of a tree, the post being pivotally coupled to the platform and extending into the notch when the post is in a vertical orientation extending upwardly from the platform; and
   a hold being attached to the post, the hold being configured to engage a strap extendable around the tree, the hold being positioned on a rear side of the post.

9. A support assembly for standing on by a person hunting from a tree, the support assembly being configured to be removably securable to the tree, the support assembly including:
   a platform having a perimeter edge, the perimeter edge including a front edge, a rear edge, a first lateral edge and a second lateral edge, the platform having a top surface, a bottom surface and an outer surface positioned between the top and bottom surfaces, the top surface being planar; and
   a plurality of gripping protuberances extending outwardly away from the outer surface of each of the first and second lateral edges in a direction coplanar with the top surface wherein the gripping protuberances are configured to be engaged by the user for stability when the user rotates relative to the platform during use.

10. The support assembly according to claim 9, further including a post being attached to the platform adjacent to the front edge, the post extending upwardly from the platform, a cleat being attached to the post adjacent to an upper end of the post, the cleat being positioned on a front side of the post and being configured to engage a surface of a tree, a hold being attached to the post, the hold being configured to engage a strap extendable around the tree, the hold being positioned on a rear side of the post.

11. The support assembly according to claim 10, the front edge having a receiving notch therein spaced from the first and second lateral edges, the post being pivotally coupled to the platform and extending into the notch when the post is in a vertical orientation extending upwardly from the platform.

12. The support assembly according to claim 11, wherein the front edge has a shape to receive a portion of a tree trunk, the front edge including a first section positioned between the first lateral edge and the receiving notch and a second section positioned between the second lateral edge and the receiving notch, the first and second sections being angled inwardly from a respective one of the first and second lateral edges and toward the receiving notch.

13. The support assembly according to claim 9, wherein the front edge has a shape to receive a portion of a tree trunk.

14. The support assembly according to claim 9, wherein the gripping protuberances extend no higher than a plane of the top surface.

* * * * *